United States Patent
Davies

[19]

[11] Patent Number: 6,144,338
[45] Date of Patent: Nov. 7, 2000

[54] PREDICTIVE DROP AND LOAD ALGORITHM FOR AN OBJECT-BASED GEOGRAPHICAL INFORMATION SYSTEM

[75] Inventor: Frederick Bryan Davies, McLean, Va.

[73] Assignee: PRC Public Sector. Inc., McLean, Va.

[21] Appl. No.: 09/042,812

[22] Filed: Mar. 17, 1998

[51] Int. Cl.[7] .................................................... G01S 5/02
[52] U.S. Cl. ...................... 342/357.13; 701/209; 701/210
[58] Field of Search ....................... 342/357.13; 701/209, 701/210

[56] References Cited

U.S. PATENT DOCUMENTS

| | | |
|---|---|---|
| 4,899,293 | 2/1990 | Dawson et al. . |
| 5,337,404 | 8/1994 | Baudelaire et al. . |
| 5,357,599 | 10/1994 | Luken . |
| 5,367,615 | 11/1994 | Economy et al. . |
| 5,381,338 | 1/1995 | Wysocki et al. . |
| 5,412,573 | 5/1995 | Barnea et al. . |
| 5,426,780 | 6/1995 | Gerull et al. . |
| 5,455,897 | 10/1995 | Nicholl et al. . |
| 5,467,441 | 11/1995 | Stone et al. . |
| 5,475,802 | 12/1995 | Wescott et al. . |
| 5,488,684 | 1/1996 | Gharachorloo et al. . |
| 5,499,371 | 3/1996 | Henninger et al. . |
| 5,519,392 | 5/1996 | Oder et al. . |
| 5,528,518 | 6/1996 | Bradshaw et al. . |
| 5,604,892 | 2/1997 | Nuttall et al. . |
| 5,631,970 | 5/1997 | Hsu . |
| 5,870,686 | 2/1999 | Monson . |
| 5,949,425 | 9/1999 | Willis . |
| 5,968,109 | 10/1999 | Israni et al. ............................... 701/208 |
| 5,986,663 | 11/1999 | Wilde . |
| 6,006,158 | 12/1999 | Pilley et al. ............................. 701/120 |

OTHER PUBLICATIONS

"A Generic Model for Planar Geographical Objects", by Michael F. Worboys, Int. J. Geographical Information Systems, 1992, vol. 6, No. 5, pp. 353–372.

"GIS and Object Oriented Technology", Considerations for Implementation of a GIS System Using Objects, Tom Myers, Nov. 26, 1996, pp. 1–5.

"GEOGR 686 Seminar in Object–Oriented GIS", S. Khoshafian et al, Autumn 1996, pp. 1–4.

"A Spatial Data Model Design for Feature–Based Geographical Information Systems", Agatha Tang, et al., Int. J. Geographical Information Systems, 1996, vol. 10, No. 5, pp. 643–659.

"Development of a Geomorphological Spatial Model Using Object–Oriented Design", Jonathan Raper et al., Int. J. Geographical Information Systems, 1995, vol. 9, No. 4, 359–383.

"Object–Oriented Approaches to Geo–Referenced Information", Michael F. Worboys, Int. J. Geographical Information Systems, 1994, vol. 8, No. 4, pp. 385–399.

"Object–Oriented Knowledge–Based Symbol Selection for Visualizing Statistical Information", Feibing Benjamin Zhan et al., Int. J. Geographical Information Systems, 1995, vol. 9, No. 3, pp. 293–315.

"Getting Started with Geographic Information Systems", Keith C. Clarke, Prentice Hall Series in Geographical Information Science, 1997 by Prentice–Hall, Inc., pp. 1–353.

*Primary Examiner*—Theodore M. Blum
*Attorney, Agent, or Firm*—Lowe, Hauptman, Gopstein, Gilman & Berner

[57] ABSTRACT

A method and system are disclosed for providing a more accurate position of a mobile receiver even though a signal received by the mobile receiver indicating the position of the mobile receiver is inaccurate. The received signal is used as an estimated indication of the position of the mobile receiver. A database comprises geometrical objects representing navigable routes. The geometrical objects include a geometry attribute defining the geometry of a complete representation of the navigable route. A geometrical object representing a navigable route is determined where the mobile receiver is probably located. The estimated position of the mobile receiver can then be compared against the geometry of the navigable route and against the previous positions in which the mobile receiver was located. The estimated position of the mobile receiver can be adjusted if necessary to provide a more probable position of the mobile receiver.

30 Claims, 9 Drawing Sheets

FIG. 4D

| OBJECT CLASS | TITLE | IDENTIFIER | FEATURE IDENTIFIER | VISIBILITY LEVEL | X-Y | COLOR | LINE WEIGHT |
|---|---|---|---|---|---|---|---|
| Point | | | | | | | |

FIG. 4A

| OBJECT CLASS | TITLE | BITMAP | VISIBILITY LEVEL | COLOR |
|---|---|---|---|---|
| Raster | | | | |

FIG. 4B

| OBJECT CLASS | TITLE | IDENTIFIER | FEATURE IDENTIFIER | ORDERED LIST OF COORDINATES |
|---|---|---|---|---|
| Polygon | A | W | Air Route | |
| | C | W | Air Route | |
| | D | W | Air Route | |
| | H | W | Air Route | |

FIG. 4C

| OBJECT CLASS | TITLE | IDENTIFIER | FEATURE IDENTIFIER | ORDERED LIST OF COORDINATES |
|---|---|---|---|---|
| Polyline | D | X | Road | |
| | H | X | Road | |
| | I | X | Road | |
| | I | Y | Exit Ramp | |
| | A | Z | Highway | |
| | C | Z | Highway | |
| | E | Z | Highway | |
| | F | Z | Highway | |
| | I | Z | Highway | |

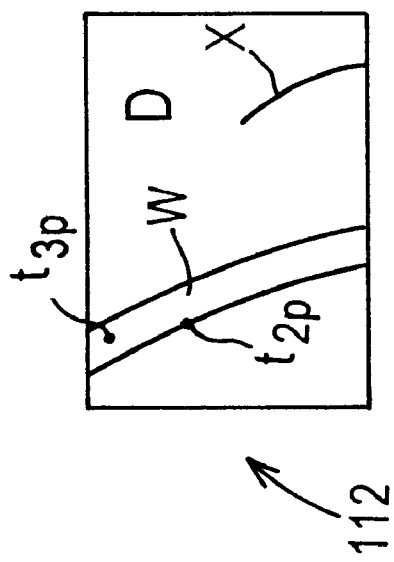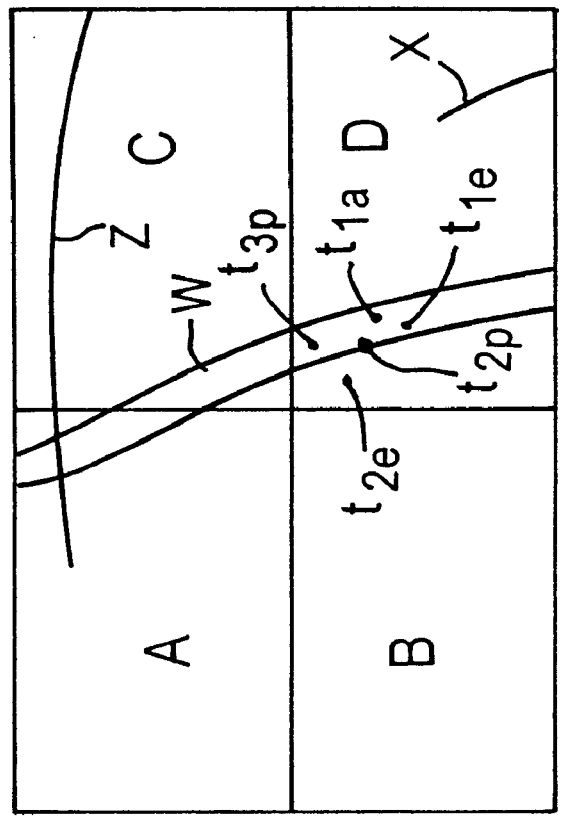

PREDICTIVE DROP AND LOAD ALGORITHM FOR AN OBJECT-BASED GEOGRAPHICAL INFORMATION SYSTEM

FIELD OF THE INVENTION

The present invention relates generally to Geographical Information Systems (GIS), and more particularly, to GIS systems usable with a positioning system, such as a global positioning system (GPS), for displaying the location of a mobile receiver on a screen display and for updating the location of the mobile receiver on the screen display in real time as the mobile receiver changes locations. Still more particularly, the present invention relates to a system for accurately determining the location of a mobile receiver, such as a GPS receiver, by resolving the inaccuracy of the signals received from GPS satellites using a predictive algorithm.

BACKGROUND OF THE INVENTION

Geographical information systems (GIS) store, retrieve and display topological information. The topological information is obtained from a topology which is a topographic study of a geographic region. The topographic study may be a map having features of the geographic region including rivers, lakes, etc. and canals, bridges, roads, etc. GIS systems can be used in conjunction with GPS satellites to display the current location of a mobile GPS receiver along with the topological information on a display screen.

It would be desirable to display the current location of the GPS receiver along with the topological information on a display screen in real time for mission critical applications. The requirement for real time is that in certain situations a driver or pilot needs to make decisions and perform course corrections within a certain amount of time or it would be too late and the vehicle, airplane or ship would crash. In the GIS environment, real time means situations where there is a need to be able to draw a map in five seconds or less which includes the current position of the mobile GPS receiver. GIS systems known to the inventor are not capable of drawing a map which includes the current position of the mobile GPS receiver in five seconds or less.

Three problems make drawing a map which includes the current position of the mobile GPS receiver in five seconds or less difficult. The first problem concerns the display by GIS systems of topological regions in real time. The solution to this problem is addressed in my copending patent applications entitled "OBJECT-BASED GEOGRAPHICAL INFORMATION SYSTEM" and "TILING OF OBJECT-BASE D GEOGRAPHICAL INFORMATION SYSTEM" both filed on even date herewith and assigned to the instant assignee and both of which are hereby incorporated by reference in their entirety into this specification.

The second problem, scrolling a topological map displayed on a screen display in real time, is addressed in the previously mentioned "TILING OF OBJECT-BASED GEOGRAPHICAL INFORMATION SYSTEM" and is further addressed in this patent application.

The third problem concerns the precision and accuracy of the signals received from GPS satellites. This problem is addressed in this patent application. By way of explanation, the following background is provided regarding GPS satellite systems. Since the early 1980's the Global Positioning System (GPS) satellite system has been utilized. This system will eventually comprise a large number of satellites in orbits approximately 11,000 miles above the earth's surface inclined about 55° from the equatorial plane. The satellites are not at a constant position but have a twelve hour orbit. At any point on the earth a ground based receiver can normally receive signals from at least four GPS satellites. A basic explanation of GPS and its use in surveying is given in Hurn. "GPS, A Guide to the Next Utility," Trimble Navigation, 1989, incorporated herein by reference thereto.

Each GPS satellite transmits signals which contain information that enables distance measurement to be made by measuring the transit time of a pseudo-random number (PRN) code from a satellite to a GPS receiver. The PRN code is a very faint signal that hardly registers above the earth's natural background noise; however, this signal can be received by an antenna only inches in size. Decoding of these signals is accomplished in known fashion by sampling the PRN code and correlating the code with a replica code generated by a GPS receiver thus permitting the PRN code to be picked out of the earth's background noise.

Two types of services produce signals from the GPS satellites. First, the Precise Position Service (PPS) produces for the military the most accurate dynamic positioning possible utilizing the GPS system, based upon the dual frequency Precise or Protected code known as the P code. Users must have an encryption code in order to access the P code which is not generally available to the public. Second, the Standard Positioning Service (SPS) produces the publicly accessible civilian positioning accuracy obtained by utilizing the single frequency "Clear Acquisition" (C/A) code. The Department of Defense has the ability to degrade the accuracy of the C/A code utilizing "Selective Availability" (S/A) or by artificially creating clock and other errors, to prevent hostile military forces from navigating accurately utilizing the C/A code. These errors include low frequency noise and high frequency noise.

Computation of positional coordinates utilizing GPS signal data may be simply accomplished by receiving the PRN code and recording the received time as measured by the receiver's clock. Relative clock offsets may be taken into account and the difference between a signal's departure time and arrival time is the total travel time. The distance from a GPS satellite to the receiver's position may then be approximated by multiplying the speed of light times the total travel time. In this manner, if time is known, a position may be determined using a minimum of three satellite signals. The calculated position can be at only one of two points at which three spheres around the three GPS satellites intersect. For a position known to be on earth, one of the points will generally be not possible (somewhere in space) so three satellites are generally enough to pinpoint a location. If precise time is not known then information from a fourth satellite will be necessary.

Thus, those skilled in the art will appreciate that GPS satellite broadcast systems permit PRN code tracking and analysis which permits positional fixes of high accuracy, but low precision due to refraction, clock errors, noise, time errors and ephemeris errors.

Upon reference to the foregoing those skilled in the art will appreciate that a need exists for a method and system which can draw a map in five seconds or less which includes the current position of the mobile receiver which may be a GPS receiver. A need exists for a method and system usable with a positioning system, such as GPS for displaying a topology and the location of a mobile receiver on a screen display of a GIS system and for updating the display of the topology and location of the mobile receiver on the screen display in real time as the mobile receiver changes locations. A need also exists for accurately determining the location of a mobile receiver by resolving the inaccuracy of the signals received from a positioning system, such as the GPS satellite system, using a predictive algorithm using a GIS system.

SUMMARY OF THE INVENTION

It is, therefore, an object of the present invention to substantially overcome the above-identified problems and substantially fulfill the above-identified needs.

It is another object of the present invention to provide a GIS system usable with the global positioning system (GPS) for displaying a topology and the location of a mobile GPS receiver on a screen display of a GIS system and for updating the topology and the location of the mobile GPS receiver on the screen display in real time as the mobile GPS receiver changes locations.

In accordance with the present invention, a more accurate position of a mobile receiver can be provided even though a signal received by the mobile receiver indicating the position of the mobile receiver is inaccurate. The received signal is used as an estimated indication of the position of the mobile receiver. A database comprising geometrical objects representing navigable routes is accessed where the geometrical objects include a geometry attribute defining the geometry of a complete representation of the navigable route. A geometrical object representing a navigable route is determined where the mobile receiver is probably located. The estimated position of the mobile receiver can then be compared against the geometry of the navigable route and against the previous positions in which the mobile receiver was located and adjusted if necessary to provide a more probable position of the mobile receiver.

In accordance with another aspect of the invention, a method is disclosed including the step of receiving a signal at a mobile receiver. An estimation is calculated of the current position of the mobile receiver based upon a received signal. At least one object-based database is accessed comprising geometrical objects representing navigable routes where each geometrical object comprises a topological region identifier attribute and a geometry attribute defining the geometry of a complete representation of the navigable route. A probable geometrical object representing a navigable route is determined where the mobile receiver is probably located from among geometrical objects having a region identifier attribute associated with the topological region in the at least one database. The estimated position of the mobile receiver is compared to the probable geometrical object representing a navigable route. If the estimated position differs from a position coinciding with a portion of the nearest navigable route represented by a probable geometrical object, the estimated position is adjusted to a probable position coinciding with a portion of the nearest navigable route represented by a probable geometrical object.

In another aspect of the invention, a method is disclosed including the step of receiving a signal at a mobile receiver and calculating an estimation of the current position of the mobile receiver based upon the received signal. An object-based database is accessed comprising geometrical objects representing topological features and navigable routes where each geometrical object comprises a tessellation identifier attribute and a geometry attribute defining the geometry of a complete representation of the topological feature or navigable route. The topology is divided into a plurality of tessellations. A probable geometrical object is determined representing a navigable route where the mobile receiver is probably located. A tessellation associated with the determined geometrical object is determined. Geometrical objects are fetched having a tessellation identifier attribute associated with the determined tessellation from the one database and geometrical objects associated with three additional tessellations adjacent to the determined tessellation wherein the four fetched tessellations form a 2×2 array. The fetched geometrical objects are loaded into a virtual blackboard. The estimated position of the mobile receiver is compared to the probable geometrical object representing a navigable route and if the estimated position differs from a position coinciding with a portion of the probable geometrical object, the estimated position is adjusted to a probable position coinciding with a portion of the probable geometrical object. The topological features are drawn using the fetched geometrical objects and a representation of the mobile receiver is drawn in the probable position on the display. The probable position of the mobile receiver is continually determined as the mobile receiver changes its probable position and crosses a boundary between the determined tessellation and an unloaded adjacent tessellation. Two of the loaded tessellations are unloaded from the virtual blackboard. Geometrical objects are fetched having a tessellation identifier associated with two additional unloaded tessellations adjacent to the determined tessellation. The fetched geometrical objects of the two additional tessellations are loaded into the virtual blackboard, one of which is the tessellation in which the mobile receiver is located. The topological features are drawn using the fetched geometrical objects of the loaded adjacent tessellation in which the mobile receiver is located. A representation of the mobile receiver is drawn in the probable position on the display.

In yet another aspect of the invention, a method is disclosed including the step of receiving a signal at a mobile receiver. and calculating an estimation of the current position of the mobile receiver based upon the received signal. At least one object-based database is accessed comprising geometrical objects representing topological features and navigable routes where each geometrical object comprises a tessellation identifier attribute and a geometry attribute defining the geometry of a complete representation of the topological feature or navigable route. The topology is divided into a plurality of tessellations. A probable geometrical object is determined representing a navigable route where the mobile receiver is probably located. A tessellation is determined which is associated with the determined geometrical object. Geometrical objects are fetched having a tessellation identifier attribute associated with the determined tessellation from the at least one database. The estimated position of the mobile receiver is compared to the probable geometrical object representing a navigable route and if the estimated position differs from a position coinciding with a portion of the probable geometrical object, adjusting the estimated position to a probable position coinciding with a portion of the probable geometrical object. The topological features are drawn using the fetched geometrical objects. A representation of the mobile receiver is drawn in the probable position on the display.

In yet another aspect of the invention, an article is disclosed including at least one sequence of machine executable instructions. A medium bears the executable instructions in machine readable form wherein execution of the instructions by one or more processors causes the one or more processors to access at least one object-based database comprising geometrical objects representing navigable routes. Each geometrical object comprises a topological region identifier attribute and a geometry attribute defining the geometry of a complete representation of the navigable route. The processor determines a probable geometrical object representing a navigable route where a mobile receiver is probably located from among geometrical objects having a region identifier attribute associated with a topological region in the one database. The processor compares an estimated position of the mobile receiver to a probable geometrical object representing a navigable route and if the estimated position differs from a position coinciding with a portion of the probable geometrical object, adjusts the estimated position to a probable position coinciding with a portion of the probable geometrical object.

In yet another aspect of the invention an article is disclosed including one sequence of machine executable instructions. A medium bears the executable instructions in machine readable form wherein execution of the instructions by one or more processors causes the one or more processors to access one object-based database comprising geometrical objects representing topological features and navigable routes. Each geometrical object comprises a tessellation identifier attribute and a geometry attribute defining the geometry of a complete representation of the topological feature or navigable route. The topology is divided into a plurality of tessellations. The processor determines a probable geometrical object representing a navigable route where a mobile receiver is probably located. The processor determines a tessellation associated with the determined geometrical object and fetches geometrical objects having a tessellation identifier attribute associated with the determined tessellation from the one database. The processor compares the estimated position of the mobile receiver to the probable geometrical object representing a navigable route and if the estimated position differs from a position coinciding with a portion of the probable geometrical object, adjusts the estimated position to a probable position coinciding with a portion of the probable geometrical object. The processor draws topological features using the fetched geometrical objects and draws a representation of the mobile receiver in the probable position on a display.

In a further aspect of the invention, a computer architecture is disclosed including accessing means for accessing one object-based database comprising geometrical objects representing navigable routes. Each geometrical object comprises a topological region identifier attribute and a geometry attribute defining the geometry of a complete representation of the navigable route. Determining means are provided for determining a probable geometrical object representing a navigable route where a mobile receiver is probably located from among geometrical objects having a region identifier attribute associated with the topological region in the one database. Comparing means are provided for comparing the estimated position of the mobile receiver to a probable geometrical object representing a navigable route and if the estimated position differs from a position coinciding with a portion of the probable geometrical object, and for adjusting the estimated position to a probable position coinciding with a portion of the probable geometrical object.

In yet a further aspect of the invention a computer architecture is disclosed including accessing means for accessing one object-based database comprising geometrical objects representing topological features and navigable routes, each geometrical object comprising a tessellation identifier attribute and a geometry attribute defining the geometry of a complete representation of the topological feature or navigable route. The topology is divided into a plurality of tessellations. Determining means are provided for determining a probable geometrical object representing a navigable route where the mobile receiver is probably located and determining a tessellation associated with the determined geometrical object. Fetching means are provided for fetching geometrical objects having a tessellation identifier attribute associated with the determined tessellation from the one database. Comparing means are provided for comparing the estimated position of the mobile receiver to the probable geometrical object representing a navigable route and if the estimated position differs from a position coinciding with a portion of the probable geometrical object and for adjusting the estimated position to a probable position coinciding with a portion of the probable geometrical object. Drawing means are provided for drawing topological features using the fetched geometrical objects and for drawing a representation of the mobile receiver in the probable position on a display.

In yet a further aspect of the invention a computer system is disclosed including a processor and a memory coupled to the processor, the memory having stored therein sequences of instructions, which, when executed by the processor, cause the processor to perform the steps of accessing one object-based database comprising geometrical objects representing navigable routes. Each geometrical object comprises a topological region identifier attribute and a geometry attribute defining the geometry of a complete representation of the navigable route. The processor determines a probable geometrical object representing a navigable route where a mobile receiver is probably located from among geometrical objects having a region identifier attribute associated with the topological region in the one database. The processor compares an estimated position of the mobile receiver to a probable geometrical object representing a navigable route and if the estimated position differs from a position coinciding with a portion of the probable geometrical object, adjusts the estimated position to a probable position coinciding with a portion of the probable geometrical object.

In a further aspect of the invention a computer system includes a processor and a memory coupled to the processor, the memory having stored therein sequences of instructions, which, when executed by said processor, cause the processor to perform the steps of accessing one object-based database comprising geometrical objects representing navigable routes. The processor accesses one object-based database comprising geometrical objects representing topological features and navigable routes. Each geometrical object comprises a tessellation identifier attribute and a geometry attribute defining the geometry of a complete representation of the topological feature or navigable route. The topology is divided into a plurality of tessellations. The processor determines a probable geometrical object representing a navigable route where the mobile receiver is probably located and determining a tessellation associated with the determined geometrical object. The processor fetches geometrical objects having a tessellation identifier attribute associated with the determined tessellation from the one database. The processor compares the estimated position of the mobile receiver to the probable geometrical object representing a navigable route and if the estimated position differs from a position coinciding with a portion of the probable geometrical object, adjusts the estimated position to a probable position coinciding with a portion of the probable geometrical object. The processor draws topological features using the fetched geometrical objects and draws a representation of the mobile receiver in the probable position on the display.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout wherein:

FIG. 4A is a diagram of the entries for a raster object database;

FIG. 4B is a diagram of the entries for a polygon object database;

FIG. 4C is a diagram of the entries for a polyline object database;

FIG. 4D is a diagram of the entries for a point object database;

FIG. 5A is an illustration of four tiles forming a 2×2 array loaded into a virtual blackboard;

FIG. 5B is an illustration of tile D being displayed on a screen display;

FIG. 5C is an illustration of tile C being displayed on the screen display;

BEST MODE FOR CARRYING OUT THE INVENTION

A method and apparatus for displaying the location of a mobile receiver on a screen display of a GIS system and for updating the location of the mobile receiver on the screen display in real time as the mobile receiver changes locations according to the present invention are described. Although the present invention is described below in terms of the preferred embodiment using GPS satellite signals received by GPS receivers, it should be understood that the present invention is equally applicable for use with any positional signal, which may be inaccurate, or of low precision. Preferred embodiments of the present invention are described for more accurately determining the location of a mobile receiver, such as a GPS receiver, by resolving the inaccuracy of the signals received from a positioning system, such as commercial GPS satellites, using a predictive algorithm. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
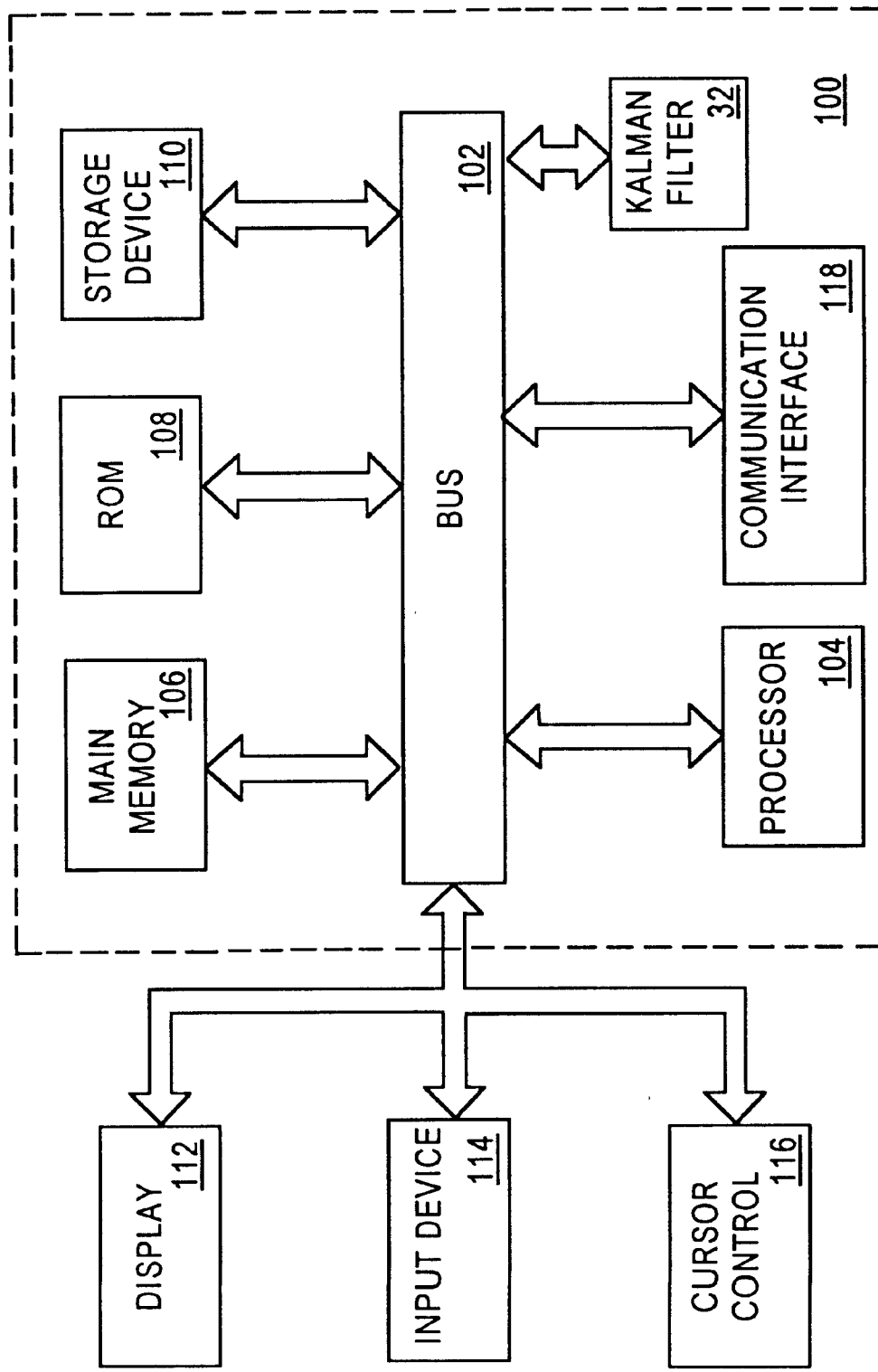
FIG. 1 is a high-level block diagram of an exemplary computer system with which the present invention can be implemented.

FIG. 1 is a block diagram illustrating an exemplary computer system 100 upon which an embodiment of the invention may be implemented. The present invention is usable with currently available personal computers, mini-mainframes and the like. The present invention is also envisioned as usable in the cockpit of an aircraft, on a ship and in moving land vehicles. It is believed that the invention described herein can readily be adapted for specific hardware configurations for each of these operating environments.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display GIS information of a topology and the position of a GPS receiver. According to one embodiment of the invention, GIS information and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 1 18 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface is coupled to a virtual blackboard 342 which may be in the main memory 106. Virtual blackboard 342 is a memory area where accessed geometrical objects are placed to enable more accurate location of the mobile receiver and to enable real time display of a topological region as explained below. Wireless links may also be implemented. In any such implementation, communication interface 118 sends and receives electrical, electromagnetic or optical signals which carry digital data streams representing various types of information. Of particular note, the communications through interface 118 may permit transmission or receipt of the topological database and/or the GIS program code, used to produce the real time topology displays.

Figure 2:
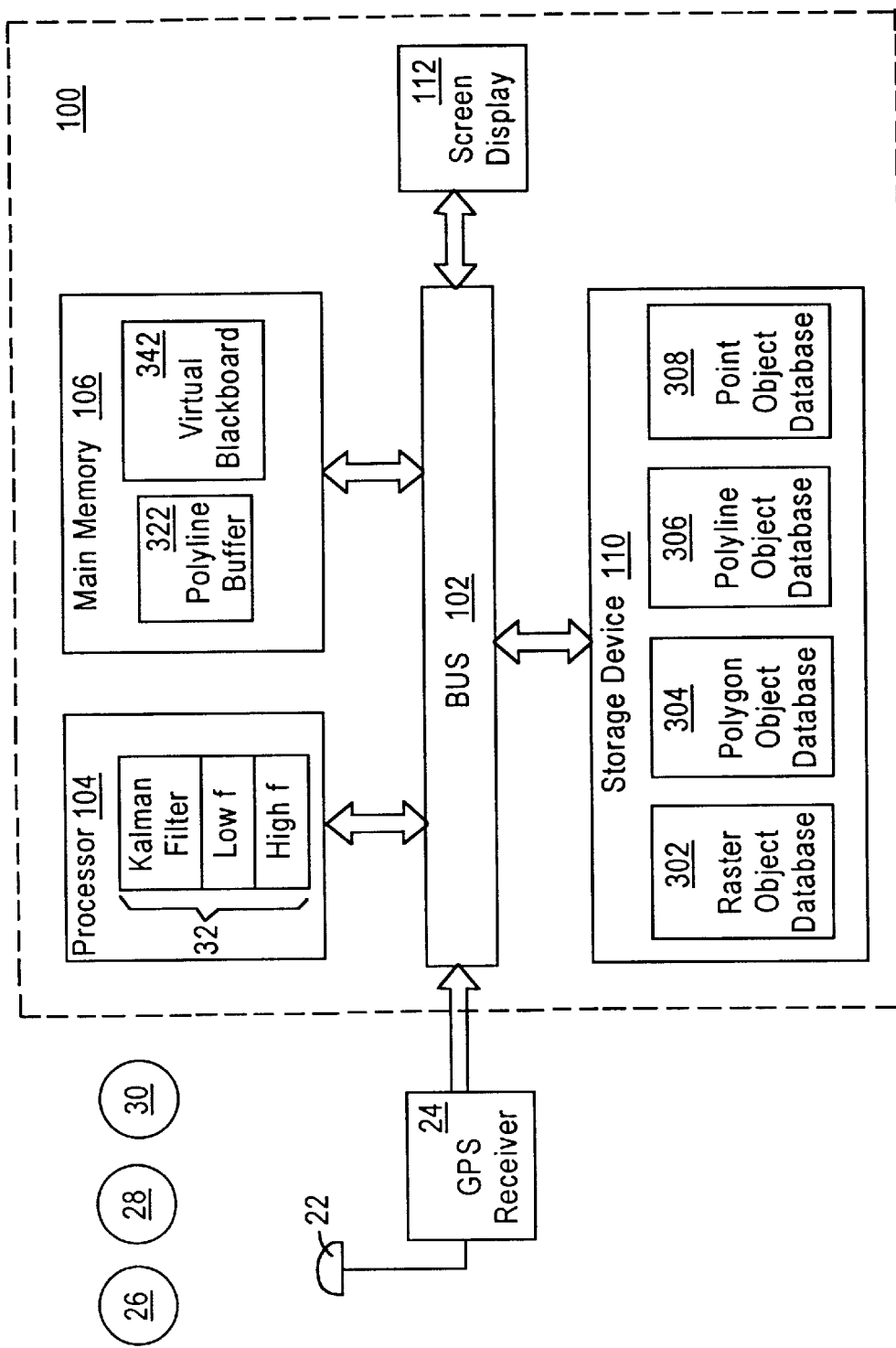
FIG. 2 is a schematic block diagram illustrating a GPS system embodiment of the present invention which rides on-board a moving vehicle, ship or aircraft and receives GPS satellite broadcasts.

Refer now to FIG. 2 where a mobile Geographical Information System (GIS) 20 having a global positioning system (GPS) receiver 24 is depicted according to the present invention. The Geographical Information System (GIS) is disclosed in greater detail in copending patent applications entitled "OBJECT-BASED GEOGRAPHICAL INFORMATION SYSTEM" and "TILING OF OBJECT-BASED GEOGRAPHICAL INFORMATION SYSTEM". The GIS systems disclosed in these two patent applications are capable of displaying a topology on a screen display in real time. As described in detail below, the addition of a GPS receiver 24 and a Kalman filter 32 (see also FIG. 1) provides the structure for displaying the location of a mobile GPS receiver on a screen display of a GIS system and for updating the location of the mobile GPS receiver on the screen display in real time as the mobile GPS receiver changes locations. The Kalman filter 32 is a conventional filter and may be implemented in hardware such as circuitry, or in computer firmware form, or as software. Although shown separately, if implemented in software, the processor 104 would execute code from memory 106 to perform the Kalman filter function. As is known, Kalman filters are frequently used in stochastic systems in which measured variables are corrupted by operational and measurement noise. The Kalman filter filters out the stochastic component of the measured variables and outputs the expected value of those variables.

In FIG. 2, there is depicted a high level block diagram of the system of the present invention which includes a mobile GIS system 20 wherein a signal from one satellite or signals from one or more satellites 26, 28 30 is received. The satellite signal is an encoded time signal and can be converted, in a manner well known in the art, to determine the position of the receiver on the earth's surface. Each of these satellites is a commercial satellite and so the signal is encoded and noise is intentionally added to the signal to prevent the use of the signal by terrorists. As is appreciated, signals from commercial GPS satellites provide an approximation of the location of the received signal.

System 20 includes a conventional GPS antenna 22 and a GPS receiver 24. The GPS antenna 22 receives a plurality of signals from the GPS broadcast satellites 26, 28, 30 in a known manner. The received signals representative of the satellite data are input from the antenna 22 to the GPS receiver 24. The receiver 24 includes circuitry for computing an estimation of the current position of the mobile GPS receiver based upon the plurality of received GPS satellite signals. The receiver 24 can only provide an estimate of the current position of the GPS receiver because of the previously described errors and noise added to the GPS signals. As previously mentioned, the difficulty with the GPS signals is that the Department of Defense introduces intentional errors into the signals. The estimated signal is then input to the computer system 100. The computer system 100 includes a conventional Kalman filter 32 coupled to the bus 102. The Kalman filter 32 includes equations for filtering low frequency noise and high frequency noise. As depicted in FIG. 2, Kalman filter 32 is in the form of firmware within the processor 104.

The GPS receiver 24 is coupled to the bus 102 of computer system 100. The processor 104 is coupled to the bus 102, and in this implementations runs the code to perform the functions of the Kalman filter 32. The processor 104 also maintains a polyline buffer 322 and a virtual blackboard 342 in main memory 106. The main memory 106 is coupled to the bus 102 to enable loading of data from raster object database 302, polygon object database 304, polyline object database 306 and point object database 308 in mass storage device 110 into the polyline buffer 322. The screen display 112 is coupled to the bus 102.

The structure depicted in FIG. 2, used in combination with an object-based database comprising geometrical objects representing navigable routes, can improve the accuracy of the estimated position provided by the GPS receiver and provide a probable position wherein the position of the GPS receiver is adjusted to coincide with a portion of the nearest navigable route. Advantageously, a priori knowledge of the GPS receiver traveling on a navigable route can be used to predict the current and future position of the GPS receiver.

Geometrical objects are especially advantageous when used with the concept of tiling. Tiling is the dividing of a geographic space into tesselations or tiles, preferably rectangular in shape. Tiling can also be thought of as dividing a layer horizontally. The geometrical objects are associated with one tile. A tile is a self-contained set of objects. As explained below, the combination of the geometrical objects and tiling provides, in part, the ability to use the GIS system of the present invention to improve the accuracy of commercial GPS signals and to use the GIS system of the present invention in real time, thus facilitating mission critical applications.

Figure 3:
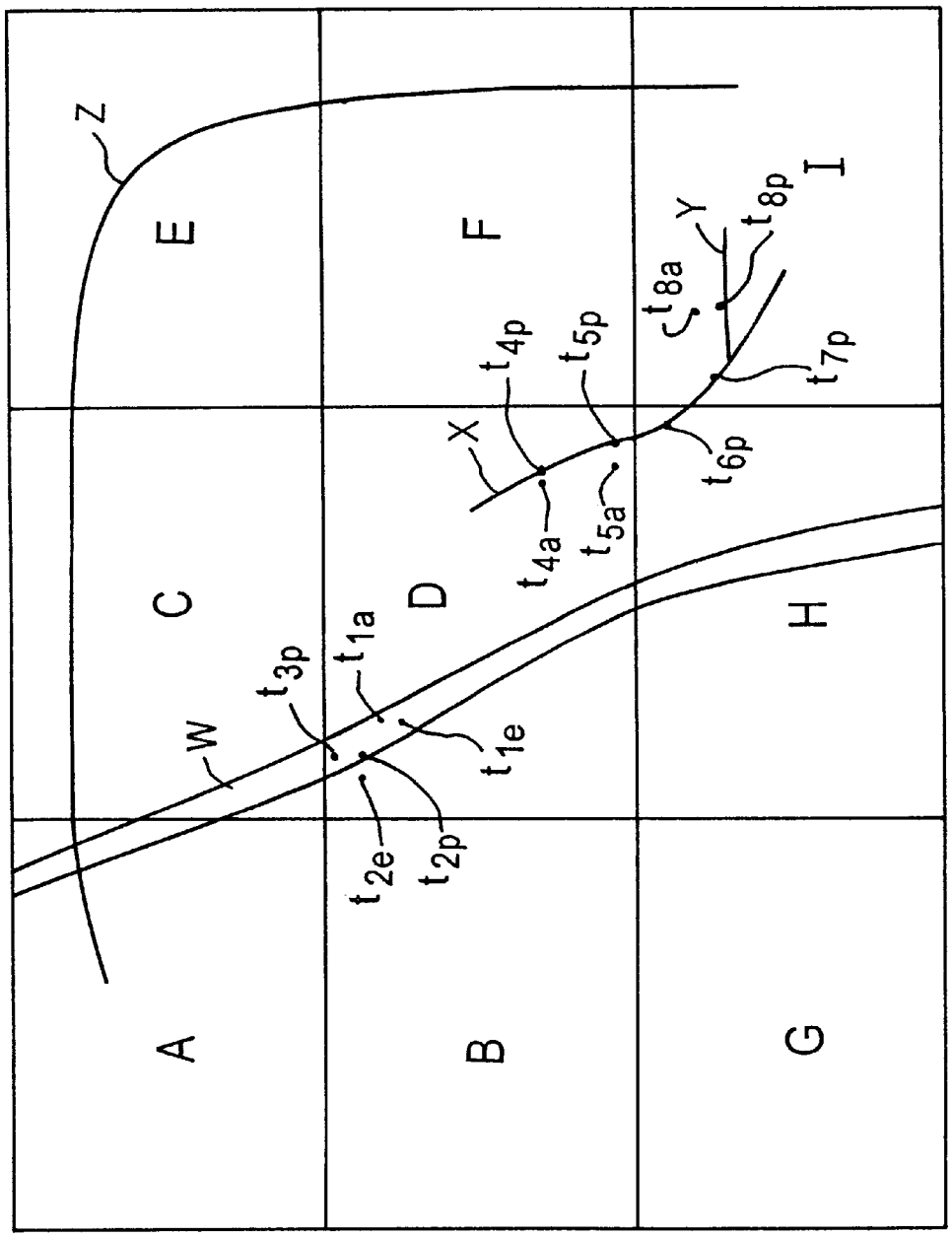
FIG. 3 is an illustration of a plurality of tiles representing a portion of a geographical region.

This improvement in accuracy of the estimated position provided by the GPS signal can best be explained with reference to FIGS. 3, 4 and 5. FIG. 3 depicts a plurality of tiles A, B, C, D, E, F, G, H, I illustrating a geographical region. For purposes of illustration only, several navigational routes are depicted along with positions of the GPS receiver at different points in time. FIG. 3 is provided as an overview for understanding FIGS. 4 and 5. FIG. 4A illustrates the raster object database 302. FIG. 4B illustrates entries for the polygon object database 304. FIG. 4C illustrates entries for the polyline object database 306. FIG. 4D illustrates the point object database 308.

All of the tiles depicted in FIG. 3 have a rectangular shape, although other shapes, such as triangles and hexagons, can be used. The tiles are positioned in horizontal rows and vertical columns. For purposes of explanation, nine tiles are depicted in FIG. 3 although a typical geographical region might have many more tiles. As depicted in FIG. 3, tiles A, C, E are in a first row, tiles B, D, F are in a second row, and tiles G, H, I are in a third row. Tiles A, B, G are in a first column, tiles C, D, H are in a second column, and tiles E, F, G are in a third column.

An important feature of the present invention is the use of geometrical objects to represent navigational routes. Navigational routes are represented by polygon objects and polyline objects. Polygon object database 304 and polyline object database 306 include entries for navigational routes.

Navigational routes vary depending on whether the GPS receiver is in a movable land vehicle such as an automobile or truck, or in an airborne craft such as an airplane or helicopter, or in a ship. Each navigational route is constrained in that there is an outer boundary to the geometry of the navigational route. As is appreciated, navigational routes for an automobile or truck include highways, streets and roads. Navigational routes for an airplane include air corridor routes which are used by commercial airlines. Navigational routes for ships include sea and navigational channels. A river might be an example of a navigational channel although the entire river may not be usable for navigation and thus the river may have an entry as a topological feature and a different entry for a navigable route. Polyline objects and polygon objects represent navigational routes.

Point objects, polyline objects and polygon objects represent topological features. The background is represented by raster objects. Point features have only a location. A lighthouse is an example of a point feature. A polyline object is a line feature from a map. The line feature has several line segments and/or points. A river is an example of a line feature.

A polygon object is a geographic feature recorded on a map as a sequence of locations or line that taken together define an enclosed area having a positive area that represents the feature. Area is a two-dimensional feature enclosed by a line that forms a boundary. A lake is an example of a polygon object. Raster objects represent the background of the map. Each raster object represents one screen display point or one pixel. These complete geometric objects are stored in an object-based data structure. These geometric objects are complete in that a record of the object includes a geometry attribute defining the geometry of a complete representation of a topological feature or navigational route. In other words, the geometrical objects need not inherit attributes from other objects.

An attribute is a characteristic of a navigational feature or a topological feature that includes a measurement or value for the feature. Examples of attributes include a feature identifier, an ordered list of coordinates and an identifier of a tile with which the feature is associated.

As can be appreciated, there are some geometric objects that are both a navigational feature and a topological feature. Examples are streets, roads and in certain circumstances, rivers. There are some geometrical objects that are navigational features only. Examples include air corridor routes. There are some geometric objects that are topological features only. Examples include forests, buildings etc.

In FIG. 3, geometrical objects W, X, Y and Z each represent a different navigational route. Polyline objects X, Y and Z are examples of objects which are both topological features and navigational routes. Polyline objects representing roads X, Y and Z are stored in polyline object database 306 as depicted in FIG. 4.

A working example of the present invention can be explained with reference to FIG. 3 depicting some representative navigational features represented by geometrical objects in tiles A–I and FIGS. 4A–D illustrating databases associated with each of the tiles of FIG. 3. FIG. 3 is not a graphical display because only one tile can be displayed at a time on the screen display 112. It should be understood that the description provided below is an overview of the basic concepts of the present invention. The specific implementation of the present invention differs from that described herein because it is believed that a completely detailed topology would obscure the present invention.

There are a total of four relational databases in the data structure: a first database for polygon objects (see 304 in FIG. 2), a second database for polyline objects (see 306 in FIG. 2), a third database for point objects (see 308 in FIG. 2) and a fourth database (see 302 in FIG. 2) for raster objects. In FIGS. 4A–D, a small number of example entries are depicted which include the objects depicted in FIG. 3. Each database includes an entry in a respective database for each object. Each entry for an object includes records for attributes which are associated with each object. Each database can be loaded from main memory 106 into polyline buffer 322 in main memory 106 for fast access by the processor 104.

In FIG. 3, a polygon object W represents an air route corridor. Because polygon object W extends into tiles A, C, D and H, polygon object W has separate entries for tiles A, C, D and H. With the exception of the tile identifier attribute which differs for each tile, the entry for each tile has identical attributes including an identifier attribute, a feature identifier attribute and an ordered list of coordinates attribute. In other words, W is replicated for each tile which means that each entry contains a complete geometry of the navigational route represented by the geometrical object.

The identifier attribute for each entry is W identifying the air route corridor. The feature identifier for each entry is listed as air route corridor but in an actual database would list a specific air route corridor. The ordered list of coordinates for each entry may include only coordinates for a boundary of a polygon or coordinates to fill in all or part of the area of the polygon. Polyline object X extends into and has entries for tiles D, H and I. With the exception of the tile identifier attribute which differs for each tile, the entry for each tile has identical attributes including an identifier attribute, a feature identifier attribute and an ordered list of coordinates attribute. The feature identifier is listed as a road, which for example might be Interstate 395. Intersecting with polyline object X is a polyline object Y which represents an exit ramp. Polyline object Y only exists in tile I and has an entry for tile Y. The feature identifier for polyline Y is exit ramp. Polyline object Z is a highway which extends into and has entries for tile A, C, E, F, I.

It should be noted that any geometrical object that extends into more than one tile is replicated meaning that there will be an entry for each geometrical object associated with more than one tile. Replicating objects is advantageous because the databases are easy to build because each feature does not have to be divided into the ordered list of coordinates that occur in each individual tile. The drawback of replicating each object is that the amount of data is larger than prior art structures and can vary from between 2.5 to 4 times greater in size as compared to prior art systems.

Referring back to the block diagram architecture of FIG. 2, and to the diagram of FIG. 3, the present invention can best be explained by way of examples. In a first example depicted in FIGS. 5A–C, let us assume that an aircraft is flying along air route corridor W and the GIS system 20 is turned on at time $t_1$. GPS antenna 22 receives a plurality of satellite signals from satellites 26, 28, 30 wherein errors are deliberately introduced into the satellite signals to reduce the position accuracy of unauthorized GPS users. The GPS receiver 24 then calculates an estimation of the current position of the mobile GPS receiver 24 based upon the plurality of GPS signals and outputs this current estimated position to the processor 104. A representation of this estimation is depicted in FIGS. 3 and 5A as $t_{1e}$. The estimated positions are being shown in FIGS. 3 and 5A for illustrative purposes. The processor 104 then, using the signal of the current estimated position, determines which tile the aircraft is currently in and then accesses databases 304, 306 and loads entries associated with tiles A, B, C and D including navigational routes W and X into the virtual blackboard 342 as illustrated in FIG. 5A. In this example, up to four tiles can be loaded into the virtual blackboard 342 at any time and form a 2×2 array. It should be understood that for illustrative purposes the virtual blackboard 342 is being illustrated as a graphical display although the virtual blackboard is not really a display but rather a memory area in the processor 104. Because the processor 104 determined that he aircraft is located in tile D, the accessed geometrical objects associated with tile D are displayed on the screen display 112 as depicted in FIG. 5B. The estimated positions are not displayed on the screen display 112.

As explained in this example, only navigational routes are being displayed with some of the navigational routes also being topological features. The processor 104 could also access databases 302 and 308 to display a complete topology. In addition, there need not be any display of a topology or navigational routes for the present invention to provide a probable position of higher accuracy than the estimated position provided by the GPS receiver. Instead the GIS system could output a signal representative of the current probable position of the mobile receiver 24.

The signal representing the current estimated position is input to processor 104 and high frequency noise is averaged with previous estimated positions over a brief time period. Thus, an averaged signal may differ from an estimated signal and a representation of the averaged signal is depicted in FIGS. 3 and 5A as $t_{1a}$. As depicted in FIGS. 3 and 5A, because the current estimated position $t_{1e}$ happens to lie within polygon object W, there may not a significant difference between the estimated signal and the averaged signal. More significantly, the processor 104 would not perform a correction due to low frequency noise because the aircraft is within a constrained navigational route. If the position of the aircraft had been adjusted, then a signal representative of the adjusted, probable position would retained by the processor 104 and this history would be accessed in determining future probable positions as explained in detail below.

Although the antenna 22 is continuously receiving signals from satellites 26, 28, 30, for simplicity, two points in time are described in this example. At time $t_2$, GPS antenna 22 receives a plurality of satellite signals from satellites 26, 28, 30 and outputs these signals to GPS receiver 24. The GPS receiver 24 then calculates an estimation of the current position of the mobile GPS receiver 24 based upon the plurality of GPS signals and outputs this current estimated position to the processor 104. A representation of this estimation is depicted in FIGS. 3 and 5A as $t_{2e}$. The signal representing the current estimated position is input into the processor 104 and high frequency noise is averaged over a brief time period and an averaged signal $t_{2a}$ is used in determining a probable position.

In this example, let us assume that the estimated and averaged positions are identical ($t_{2e}=t_{2a}$). Thus, the position of the aircraft based on the estimated position $t_{2e}$ and the averaged position $t_{2a}$ are not within the boundary of air route corridor W. The processor 104 would determine which geometrical object is nearest to the averaged position based on a perpendicular distance between a point representing the averaged signal and each of the geometrical objects which are potential navigational routes. A potential navigation route can be determined using the feature identifier attribute. For example, an attribute of an air corridor is a potential navigation route for an aircraft and for an automobile potential navigation routes are streets, roads, and the like.

The point has to be within a predetermined controlled distance of the boundary of the geometrical object representing a potential navigable route. In this instance, the processor 104 would perform a comparison of the averaged position $t_{2a}$ against the ordered list of coordinates attribute of the geometrical object W representing the air route corridor W and would also access the history of the probable positions of the aircraft. In part, because the aircraft was previously within air route corridor W, the position of the aircraft would be adjusted by determining the position of the aircraft to the closest perpendicular point $t_{2p}$ in the ordered list of coordinates of the geometrical object representing air route corridor W. The processor 104 would not have performed this adjustment had the point representing the averaged signal been outside a predetermined controlled distance of the boundary of the geometrical object. A representation of the probable position $t_{2p}$ would then be drawn on the screen display 112.

Assuming that the aircraft is on course, the aircraft would eventually cross boundary between tile D and tile C. If tiles A, B, C, D are loaded into virtual blackboard 342, and the navigational routes of tile D are being displayed on screen display 112, then screen display 112 would be scrolled to display tile C when the aircraft crosses this boundary. The determination of when to scroll depends on how quickly the aircraft is traversing the tiles. The determination is preferably based on using a previous probable position and a history of the velocity of the aircraft.

The determination of which tile to scroll to is performed as follows. Assume that the probable position at time $t_{3p}$ is as depicted in FIGS. 3 and 5A. The processor 104 computes a vector between $t_{2p}$ and $t_{3p}$, the major component of which is a y vector because in this example the aircraft is primarily flying in a south-north direction. Thus, the processor 104 will cause screen display 112 to scroll from a display of tile D to a display of tile C and will fetch the geometrical objects associated with tile C from the virtual blackboard 342 at the appropriate time and draw these geometrical objects on screen display 112 as depicted in FIG. 5C which should be at approximately the point in time that the aircraft is crossing this imaginary boundary.

A slightly more complex example using an automobile driving on road X in a north-south direction can be explained with reference to polyline object X in FIGS. 3 and FIGS.

Figure 6A:
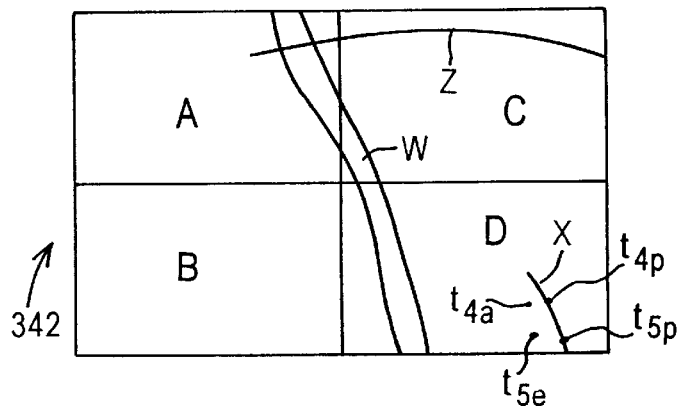
FIGS. 6A, 6C and 6E are different illustrations of four tiles loaded into the virtual blackboard.
Figure 6B:
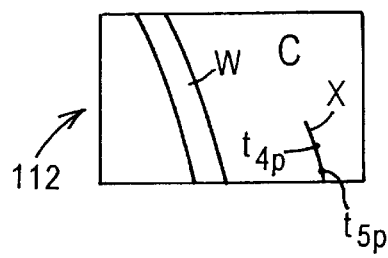
FIGS. 6B, 6D and 6F are different illustrations of tiles C, H and I, respectively, being displayed on the screen display.

6A–6F. In this example, however, the computation of the estimated and averaged signals will be omitted from the discussion for clarity although these positions are depicted in FIGS. 3 and 6A, 6C, 6E. Tiles A, B, C and D have already been loaded into the virtual blackboard 342 as depicted in FIG. 6A and tile D is being displayed on the screen display 112 as depicted in FIG. 6B.

Assuming, that the averaged signal at $t_{4a}$ is outside of polyline X, but within a controlled distance from polyline X, the probable position of the automobile will be adjusted to a point represented at $t_{4p}$ on polyline X. The same occurs at time $t_5$ where $t5_a$ is outside polyline X and will be adjusted to $t5_p$. The processor 104 computes a vector between $t_{4p}$ and $t_{5p}$, the major component of which is a y vector because in this example the automobile is primarily moving in a north-south direction. However, in this instance tile H is not loaded into the virtual blackboard 342 because the virtual blackboard 342 can only hold four tiles and tiles A, B, C, and D were already loaded.

Figure 6C:
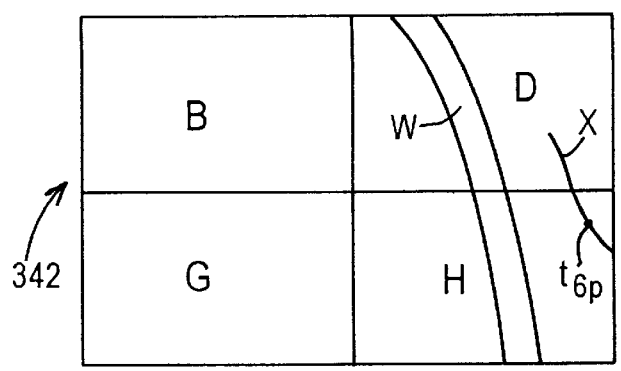
Figure 6D:
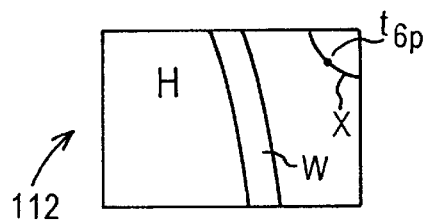

The processor 104 causes tiles A and C to be dropped from the virtual blackboard 342 and tiles G and H added to the virtual blackboard 342 to form a new 2×2 array as depicted in FIG. 6C. The screen display 112 then scrolls to display tile H as depicted in FIG. 6D along with the mobile receiver 24 at position $t_{6p}$.

Figure 6E:
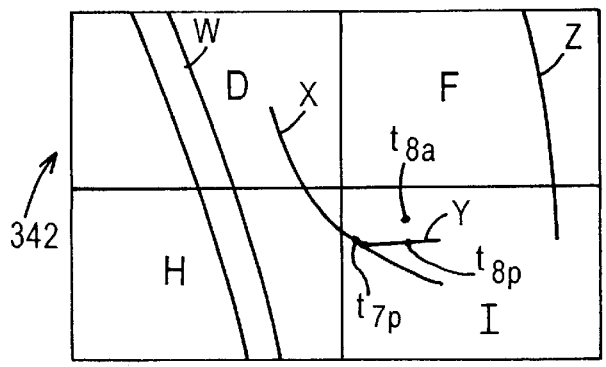
Figure 6F:
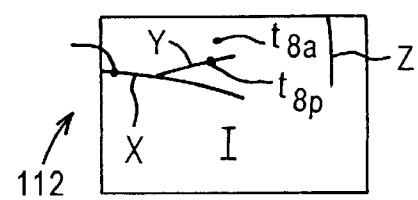

Should the automobile continue on polyline X from position $t_{6p}$, then tiles B and G would be dropped and tiles F and I loaded into the virtual blackboard 342 as depicted in FIG. 6E and the screen display would scroll from tile H to tile I and display tile I as depicted in FIG. 6F. In FIGS. 6E and 6F, at position $t_{7p}$, the automobile could either continue on polyline X or proceed on exit ramp Y represented by polyline object Y. Assume that the automobile exited onto exit ramp Y and the first averaged position $t_{8a}$ is outside of polyline object Y as depicted in FIG. 6E. The probable position of the automobile at time $t_8$ would be adjusted to the position depicted in FIGS. 6E and 6F at $t_{8p}$.

The drop and load feature can be explained simply by reference back to FIG. 3 which depicts highway Z which extends from tile A into tiles C, E, F and I. Assume an automobile started in tile A, with tile A being displayed on screen display 112, with tiles A, B, C, D loaded into the virtual blackboard. The automobile would then travel through tiles C, E, F and I. As the automobile traveled from tile A and entered tile C, there would be no change to the virtual 25 blackboard 342 but the screen display 112 would scroll from tile A to tile C. When the automobile traveled from tile C to tile E, tiles A and B would be dropped and tiles E and F added. The screen display 112 would scroll from tile C to tile E. When the automobile traveled from tile E to tile F, there would be no change to the virtual blackboard 342 but the screen display 112 would scroll from tile E to tile F. Finally, in this example, when the automobile traveled from tile F to tile I, tiles C and E would be dropped from the virtual blackboard 342 and tiles H and I loaded. The screen display 112 would scroll from tile F to tile I.

Advantageously, the method and apparatus of the present invention can scroll from one screen display to another in real time as an aircraft, automobile or ship moves across a topology. This permits the present invention to accurately determine the probable position of the GPS receiver by having access to the geometric objects stored in the database. Fast access to the geometric objects is critical to making the determination. The ability to predictively drop and load tiles provides fast access to the geometric objects needed to determine the probable position as the GPS receiver which is particularly important as the GPS receiver moves into tiles not previously loaded into the polyline buffer 322. The ability to predictively drop and load tiles also permits the screen display 112 to be scrolled from one tile to the next in real time.

The present invention provides a method and apparatus for predictive dropping and loading entries associated with the tiles from the virtual blackboard 342 so that the topology or navigational routes can be displayed in real time. Tiles are always stored in the virtual blackboard 342 in a 2×2 array and only two tiles are dropped and loaded at any one time. Thus, a difficulty can arise should the GPS receiver be moving at precisely a 45° angle toward a corner such as the intersection of the boundaries of tile D, F, H, I. In this situation, referring back to FIG. 3, it is possible that the automobile could drive directly from tile D to tile I.

Figure 7:
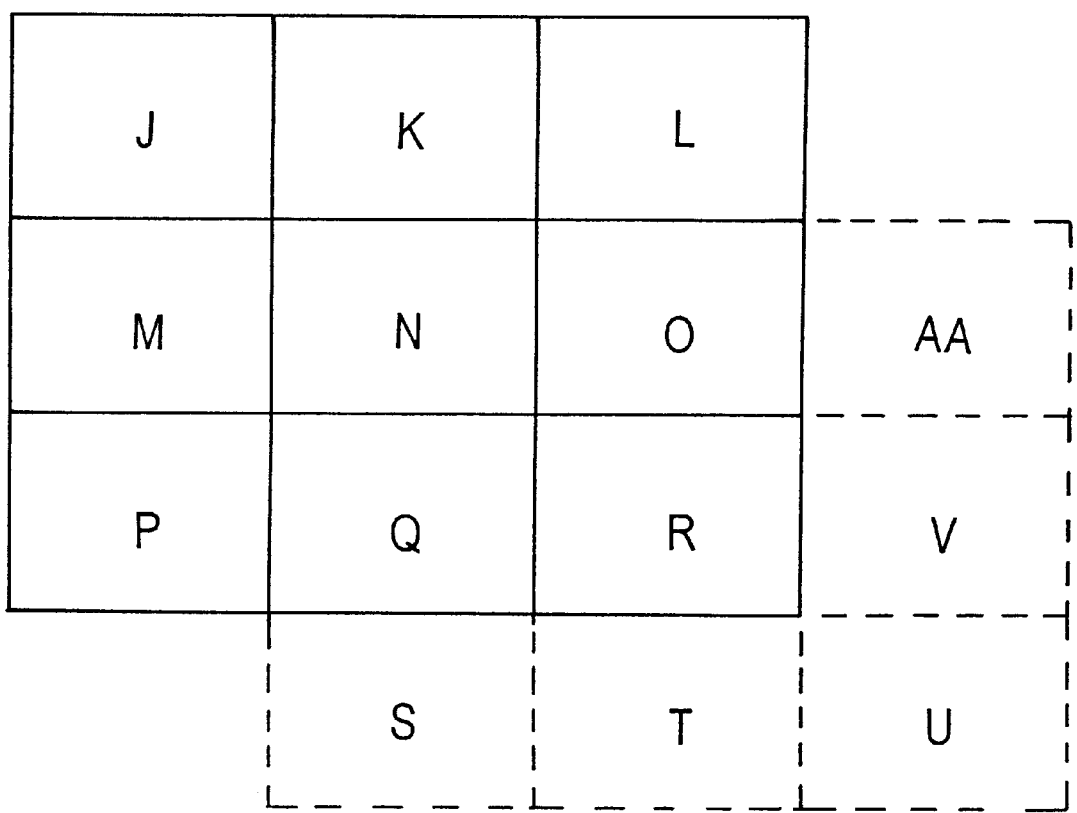
FIG. 7 is a diagram of a nine-tile embodiment according to the present invention.

Another embodiment is depicted in FIG. 7 which utilizes nine tiles J, K, L, M, N, O, P, Q, R in loaded into the virtual blackboard 342 in a 3×3 array. In this embodiment the position of the GPS receiver on the screen display 112 is always maintained in the center, for example, in tile N. This embodiment is advantageous over the previously described 2×2 array because the next adjacent tile is always loaded into the virtual blackboard 342. Thus, if an aircraft were flying from tile N directly into tile R, five tiles L, K, J, M, P would be dropped and tiles S, T, U, V, AA added to the virtual blackboard. The difficulty with this embodiment, as can be appreciated, is that it takes more time and memory to drop and load five tiles instead of two.

The present invention is also applicable to collision avoidance systems in which two or more positions of mobile GPS receivers are predicted. For example, in an aircraft collision avoidance system, by using estimated GPS signals from two airplanes, the geometrical objects representing the air corridor routes on which the two airplanes are flying, and a history of the probable positions over time, aircraft collisions can be predicted and avoided.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method, comprising the steps of:
  receiving a signal at a mobile receiver;
  calculating an estimation of the current position of the mobile receiver within a topological region based upon the received signal;
  accessing one object-based database comprising geometrical objects representing navigable routes, each geometrical object comprising a topological region identifier attribute and a geometry attribute defining the geometry of a complete representation of the navigable route;
  determining a probable geometrical object representing a navigable route where the mobile receiver is probably located from among geometrical objects having a region identifier attribute associated with the topological region in the one database; and
  comparing the estimated position of the mobile receiver to the probable geometrical object representing a navigable route and if the estimated position differs from a position coinciding with a portion of the probable geometrical object, adjusting the estimated position to a probable position coinciding with a portion of the probable geometrical object.

2. The method of claim 1, wherein said signal comprises a plurality of GPS satellite signals wherein each of the signals includes errors to reduce the position accuracy of each of the signals and wherein the mobile receiver is a GPS receiver.

3. The method of claim 2, wherein said comparing step includes the steps of:
averaging each signal over a period of time to compensate for a high frequency noise from said plurality of GPS satellite signals and outputting an averaged signal, the averaged signal including a low frequency noise;
computing an averaged position of the mobile GPS receiver from the averaged signal;
comparing the averaged position to the nearest position that would coincide with a portion of the nearest navigable route represented by a geometrical object to obtain a probable position.

4. The method of claim 1, comprising maintaining a history of previous probable positions over a period of time and wherein said comparing step includes the step of comparing the probable position to previous probable positions and determining whether the probable position is consistent with previous probable positions.

5. The method of claim 1, comprising maintaining a history of the previous nearest navigable route represented by a geometrical object and wherein said comparing step includes the step of comparing the navigable route to the previous navigable route.

6. The method of claim 1, wherein said comparing step includes the step of computing the nearest navigable route by calculating a shortest perpendicular distance between the estimated position and nearby navigable routes represented by geometrical objects.

7. The method of claim 3, wherein said comparing the averaged position step is performed using a Kalman filter.

8. The method of claim 1, wherein the geometrical objects represent constrained navigable routes such as roads, streets, sea channels, navigation channels and air corridor routes.

9. A method, comprising the steps of:
receiving a signal at a mobile receiver;
calculating an estimation of the current position of the mobile receiver based upon the received signal;
accessing one object-based database comprising geometrical objects representing topological features and navigable routes, each geometrical object comprising a tessellation identifier attribute and a geometry attribute defining the geometry of a complete representation of the topological feature or navigable route, the topology being divided into a plurality of tessellations;
determining a probable geometrical object representing a navigable route where the mobile receiver is probably located and determining a tessellation associated with the determined geometrical object;
fetching geometrical objects having a tessellation identifier attribute associated with the determined tessellation from the one database and geometrical objects associated with three additional tessellations adjacent to the determined tessellation wherein the four fetched tessellations form a 2×2 array;
loading the fetched geometrical objects into a virtual blackboard;
comparing the estimated position of the mobile receiver to the probable geometrical object representing a navigable route and if the estimated position differs from a position coinciding with a portion of the probable geometrical object, adjusting the estimated position to a probable position coinciding with a portion of the probable geometrical object; drawing topological features using the fetched geometrical objects and drawing a representation of the mobile receiver in the probable position on the display; and
continually determining the probable position of the mobile receiver and as the mobile receiver changes its probable position and crosses a boundary between the determined tessellation and an unloaded adjacent tessellation and performing the further steps of:
unloading two of the loaded tessellations from the virtual blackboard;
fetching geometrical objects having a tessellation identifier associated with two additional unloaded tessellations adjacent to the determined tessellation;
loading the fetched geometrical objects of the two additional tessellations into the virtual blackboard, one of which is the tessellation in which the mobile receiver is located;
drawing topological features using the fetched geometrical objects of the loaded adjacent tessellation in which the mobile receiver is located and drawing a representation of the mobile receiver in the probable position on the display.

10. A method, comprising the steps of:
receiving a signal at a mobile receiver;
calculating an estimation of the current position of the mobile receiver based upon the received signal;
accessing one object-based database comprising geometrical objects representing topological features and navigable routes, each geometrical object comprising a tessellation identifier attribute and a geometry attribute defining the geometry of a complete representation of the topological feature or navigable route, the topology being divided into a plurality of tessellations;
determining a probable geometrical object representing a navigable route where the mobile receiver is probably located and determining a tessellation associated with the determined geometrical object;
fetching geometrical objects having a tessellation identifier attribute associated with the determined tessellation from the one database;
comparing the estimated position of the mobile receiver to the probable geometrical object representing a navigable route and if the estimated position differs from a position coinciding with a portion of the probable geometrical object, adjusting the estimated position to a probable position coinciding with a portion of the probable geometrical object; and
drawing topological features using the fetched geometrical objects and drawing a representation of the mobile receiver in the probable position on the display.

11. The method of claim 10, wherein said signal comprises a plurality of GPS satellite signals wherein each of the signals includes errors to reduce the position accuracy of each of the signals and wherein the mobile receiver is a GPS receiver.

12. The method of claim 10, comprising maintaining a history of previous probable positions over a period of time and wherein said comparing step includes the step of comparing the probable position to previous probable positions and determining whether the probable position is consistent with previous probable positions.

13. The method of claim 10, comprising maintaining a history of the previous nearest navigable route represented by a geometrical object and wherein said comparing step includes the step of comparing the navigable route to the previous navigable route.

14. The method of claim 10, wherein said comparing step includes the step of computing the nearest navigable route by calculating a shortest perpendicular distance between the estimated position and nearby navigable routes represented by geometrical objects.

15. The method of claim 10, further comprising the step of fetching geometrical objects having a tessellation identifier associated with three additional tessellations adjacent to the determined tessellation wherein the four fetched tessellations form a 2×2 array.

16. The method of claim 15, further comprising the step of loading the fetched geometrical objects into a virtual blackboard.

17. The method of claim 16, further comprising the step of continually determining the probable position of the mobile GPS receiver and as the mobile GPS receiver changes its probable position and crosses a boundary between the determined tessellation and a loaded adjacent tessellation performing the further step of drawing topological features using the fetched geometrical objects of the loaded adjacent tessellation and drawing a representation of the GPS receiver in the probable position on the display.

18. The method of claim 17, wherein said drawing step is performed in real time.

19. The method of claim 16, further comprising the step of continually determining the probable position of the mobile GPS receiver and as the mobile GPS receiver changes its probable position and crosses a boundary between the determined tessellation and an unloaded adjacent tessellation performing the further steps of:

unloading two of the loaded tessellations from the virtual blackboard;

fetching geometrical objects having a tessellation identifier associated with two additional unloaded tessellations adjacent to the determined tessellation;

loading the fetched geometrical objects of the two additional tessellations into the virtual blackboard, one of which is the tessellation in which the GPS receiver is located;

drawing topological features using the fetched geometrical objects of the loaded adjacent tessellation in which the GPS receiver is located and drawing a representation of the GPS receiver in the probable position on the display.

20. The method of claim 19, wherein said drawing step is performed in real time.

21. The method of claim 10, wherein the tessellations are rectangular.

22. The method of claim 11, wherein said comparing step includes the steps of:

averaging each signal over a period of time to compensate for a high frequency noise from said plurality of GPS satellite signals and outputting an averaged signal, the averaged signal including a low frequency noise;

computing an averaged position of the mobile GPS receiver from the averaged signal;

comparing the averaged position to the nearest position that would coincide with a portion of the nearest navigable route represented by a geometrical object to obtain a current probable position.

23. The method of claim 22, wherein said comparing the averaged position step is performed using a Kalman filter.

24. The method of claim 10, wherein the geometrical objects represent constrained navigable routes such as roads, streets, sea channels, navigation channels and air corridor routes.

25. An article, comprising:

at least one sequence of machine executable instructions;

a medium bearing the executable instructions in machine readable form, wherein execution of the instructions by one or more processors causes the one or more processors to:

access at least one object-based database comprising geometrical objects representing navigable routes, each geometrical object comprising a topological region identifier attribute and a geometry attribute defining the geometry of a complete representation of the navigable route;

determine a probable geometrical object representing a navigable route where a mobile receiver is probably located from among geometrical objects having a region identifier attribute associated with a topological region in the at least one database; and compare an estimated position of the mobile receiver to the probable geometrical object and if the estimated position differs from a position coinciding with a portion of the probable geometrical object, adjusting the estimated position to a probable position coinciding with a portion of the probable geometrical object.

26. An article comprising:

at least one sequence of machine executable instructions;

a medium bearing the executable instructions in machine readable form, wherein execution of the instructions by one or more processors causes the one or more processors to:

access at least one object-based database comprising geometrical objects representing topological features and navigable routes, each geometrical object comprising a tessellation identifier attribute and a geometry attribute defining the geometry of a complete representation of the topological feature or navigable route, the topology being divided into a plurality of tessellations;

determine a probable geometrical object representing a navigable route where a mobile receiver is probably located and determining a tessellation associated with the determined geometrical object;

fetch geometrical objects having a tessellation identifier attribute associated with the determined tessellation from the at least one database;

compare the estimated position of the mobile receiver to the probable geometrical object representing a navigable route and if the estimated position differs from a position coinciding with a portion of the probable geometrical object, adjusting the estimated position to a probable position coinciding with a portion of the probable geometrical object; and draw topological features using the fetched geometrical objects and draw a representation of the mobile receiver in the probable position on a display.

27. A computer architecture, comprising:

accessing means for accessing at least one object-based database comprising geometrical objects representing navigable routes, each geometrical object comprising a topological region identifier attribute and a geometry attribute defining the geometry of a complete representation of the navigable route;

determining means for determining a probable geometrical object representing a navigable route where a mobile receiver is probably located from among geometrical objects having a region identifier attribute associated with a topological region in the at least one database; and comparing means for comparing the estimated position of the mobile receiver to a probable geometrical object and if the estimated position differs from a position coinciding with a portion of the probable geometrical object, adjusting the estimated position to a probable position coinciding with a portion of the probable geometrical object.

28. A computer architecture comprising:

accessing means for accessing at least one object-based database comprising geometrical objects representing topological features and navigable routes, each geometrical object comprising a tessellation identifier attribute and a geometry attribute defining the geometry of a complete representation of the topological feature or navigable route, the topology being divided into a plurality of tessellations;

determining means for determining a probable geometrical object representing a navigable route where the mobile receiver is probably located and determining a tessellation associated with the determined geometrical object;

fetching means for fetching geometrical objects having a tessellation identifier attribute associated with the determined tessellation from the at least one database;

comparing the estimated position of the mobile receiver to the probable geometrical object representing a navigable route and if the estimated position differs from a position coinciding with a portion of the probable geometrical object, adjusting the estimated position to a probable position coinciding with a portion of the probable geometrical object; and drawing topological features using the fetched geometrical objects and drawing a representation of the mobile receiver in the probable position on a display.

29. A computer system comprising:

a processor; and a memory coupled to said processor, the memory having stored therein sequences of instructions, which, when executed by said processor, cause said processor to perform the steps of:

accessing at least one object-based database comprising geometrical objects representing navigable routes, each geometrical object comprising a topological region identifier attribute and a geometry attribute defining the geometry of a complete representation of the navigable route;

determining a probable geometrical object representing a navigable route where a mobile receiver is probably located from among geometrical objects having a region identifier attribute associated with a topological region in the one database; and comparing an estimated position of the mobile receiver to the probable geometrical object representing a navigable route and if the estimated position differs from a position coinciding with a portion of the probable geometrical object, adjusting the estimated position to a probable position coinciding with a portion of the probable geometrical object.

30. A computer system comprising:

a processor; and a memory coupled to said processor, the memory having stored therein sequences of instructions, which, when executed by said processor, cause said processor to perform the steps of:

accessing at least one object-based database comprising geometrical objects representing topological features and navigable routes, each geometrical object comprising a tessellation identifier attribute and a geometry attribute defining the geometry of a complete representation of the topological feature or navigable route, the topology being divided into a plurality of tessellations;

determining a probable geometrical object representing a navigable route where a mobile receiver is probably located and determining a tessellation associated with the determined geometrical object;

fetching geometrical objects having a tessellation identifier attribute associated with the determined tessellation from the at least one database;

comparing an estimated position of the mobile receiver to the probable geometrical object representing a navigable route and if the estimated position differs from a position coinciding with a portion of the probable geometrical object, adjusting the estimated position to a probable position coinciding with a portion of the probable geometrical object; and drawing topological features using the fetched geometrical objects and drawing a representation of the mobile receiver in the probable position on a display.

* * * * *